United States Patent [19]
Eriksson et al.

[11] Patent Number: 5,481,429
[45] Date of Patent: Jan. 2, 1996

[54] DISTRIBUTION OF COOLING AIR IN SWITCHGEAR CUBICLES

[75] Inventors: Stig Eriksson; Lars-Ove Mogren; Bertil Moritz, all of Västerås, Sweden

[73] Assignee: ASEA Brown Boveri AB, Vasteras, Sweden

[21] Appl. No.: 370,822

[22] Filed: Jan. 10, 1995

Related U.S. Application Data

[63] Continuation of Ser. No. 117,039, Sep. 7, 1993, abandoned.

[30] Foreign Application Priority Data

Mar. 18, 1991 [SE] Sweden ................................ 9100806

[51] Int. Cl.6 .................................................. H02B 1/00
[52] U.S. Cl. .......................................... 361/678; 361/695
[58] Field of Search .............................. 361/688, 690, 361/694–697, 676–678, 831

[56] References Cited

U.S. PATENT DOCUMENTS

| | | |
|---|---|---|
| 3,230,293 | 1/1966 | Turgeon . |
| 3,778,680 | 12/1973 | Vaneerden ................................ 361/677 |
| 4,378,461 | 3/1983 | Haginomori . |

FOREIGN PATENT DOCUMENTS

| | | |
|---|---|---|
| 0057411 | 8/1982 | European Pat. Off. . |
| 2568712 | 2/1986 | France . |
| 109148 | 2/1978 | Japan ....................................... 361/676 |
| 449150 | 6/1987 | Sweden . |
| 467945 | 5/1992 | Sweden . |

OTHER PUBLICATIONS

Abstract of JP 58–241,936, dated Jul. 17, 1985.

*Primary Examiner*—Gregory D. Thompson
*Attorney, Agent, or Firm*—Watson, Cole, Grindle & Watson

[57] ABSTRACT

A device for distributing cooling air to switchgear cubicles, the method including distributing cooling air or other cooled gas in a series of closely arranged switchgear cubicles (1a–1d) which are insulated from the surrounding air, the cooling air or gas flowing along the same path as the current lines extending through and into the cubicles. The air or gas is distributed to the respective cubicles (1a–1d) in the series of cubicles via channels (5,6a–6d) in the form of protective channels or busbar boxes which constitute semiprotection for the single-phase or multi-phase busbars (4a–4d) which distribute electric current to the cubicles and to the electric equipment present in the cubicles. The cubicles. The direction of the cooling gas distribution is the same as the current direction or reversed relative thereto.

5 Claims, 2 Drawing Sheets

DISTRIBUTION OF COOLING AIR IN SWITCHGEAR CUBICLES

CROSS-REFERENCE TO RELATED APPLICATION

This is a continuation of application Ser. No. 08/117,039, filed Sep. 7, 1993, now abandoned, which derived from PCT/SE92/00089, filed Feb. 14, 1992.

TECHNICAL FIELD

The present invention relates to a method and a device for distributing air in electric apparatus cubicles, such as, for example, in switchgear and corresponding plants. The method of distributing the air in cubicles entails an adaptation to the local cooling requirement of the equipment located in the cubicles.

BACKGROUND ART

Electric and electronic equipment utilized in industrial processes, switchgear and similar uses is generally enclosed in a casing of metal, usually some form of apparatus cubicle. The casing or the cubicle is utilized, inner alia, as a frame for internal installation of electric components, but also as protective casing for the electric equipment with respect to the influence of dust, moisture, aggressive agents, etc., as well as semiprotection for reasons of personal safety. In connection with this enclosure, the problem arises regarding the removal of heat emitted by the components present in the cubicles by the power developed in these components.

Thermal dissipation may be arranged in many ways, for example by radiation from the walls of the cubicles themselves, aeration of the cubicles by self-convection with the aid of ventilating openings, aeration with the aid of fans and filters, forced aeration by way of heat exchangers and conditioning by means of refrigerating machines.

If cooling is performed by ambient air, treatment of the air in the form of, for example, cleaning or drying may be necessary in those cases when the cubicles are located in a fouled or moist environment. Such cleaning may comprise filtering of the air or the removal of corrosive gases from the ambient air before this is supplied, in cleaned form, to the interior of the cubicles for cooling of the components located there. A number of different partial solutions for cleaning or treating air in the above-mentioned manner in individual apparatus cubicles for the purpose of removing excess heat from the cubicles are known. Such single-cubicle solutions are described, inter alia, in the patent documents EP,A3, 57 411, FR,A1,2 568 712 and JP 58-241 936.

In switchgear or other types of industrial plants where the electric equipment is extensive, it may be required that a number of cubicles assembled into a series of cubicles are arranged. A cubicle series of this kind is generally designed as a series of cubicles arranged in one or more rows with the individual cubicles placed side-by-side close to each other. Upon removal of heat from electric equipment in a cubicle series of the above-mentioned kind, single-cubicle solutions according to the above are not applicable. Providing each individual cubicle with its own air treatment unit cannot be justified from an economical point of view. Instead it is common to use an air treatment plant, also called a conditioning plant, to cool, moisten, dry or clean the air in the entire room where the cubicles in a series of cubicles are stored. With this method it is possible to achieve the desired cooling or cleaning of air to the electric equipment in the cubicles. The method can also be supplemented with fans in the individual cubicles to prevent the formation of stationary hot air zones inside the cubicles.

Treating all the air in a room to attain the desired effect with respect to, for example, the cooling requirement is not a good solution. The air volume that has to be treated is large, which means that the air treatment plant must be dimensioned for an air volume which is many times larger than the air volume which really passes the apparatus cubicles for cooling. This renders the air treatment plant more expensive than necessary. Another difficulty is that the room climiate must be adapted to human needs, since personnel may be present in the rooms mentioned. In this way it is not possible to optimize, for example, air temperature or air composition according to the primary requirements of the electric equipment. Treated air supplied to the room where the apparatus cubicles are erected is normaally varied within an interval of a couple of degrees above or below room temperature.

It is known that as large a percentage as 60–70% of normal operating environments for electric and electronic equipment in certain industries as, for example, paper and pulp industries, are so corrosive that they have a marked influence on the reliability of service and the service life of the equipment. Currently, therefore, this problem is often solved by air treatment comprising chemical filtering of the air in the whole of the room where the electric equipment in question is located, which entails treatment of a disproportionately large air volume.

It is also known that the service life of certain components of semiconductor type is greatly temperature-dependent. For these components, as low a temperature as possible in the immediate surroundings of the component is therefore desired. For electric equipment such as apparatus and electric busbars, the allowed working temperature is normally maximized in dependence on the temperature durability of the conductors and/or the insulating materials. The working temperature is dependent on both the immediate ambient temperature and the self-heating of the apparatus during normal loading. An increase of the temperature also provides an increase of the resistance of electric conductors in the equipment, which results in increased power output and a further increase of the temperature.

Swedish Patent No. 467,945 describes a method of treating the air in a series of adjacently located electrical apparatus cubicles, which are closed in relation to the surrounding air, by means of an air treatment unit common to the cubicles in order to reduce the air quantity treated. The method for air treatment comprises passing cleaned and cooled, possibly also hydrated or dried air, from an air treatment unit via a common channel and further via parallel branch Pipes with pressure-regulating devices for regulating the air flow, directly to each individual apparatus cubicle, these apparatus cubicles being adapted to receive the treated air, distribute the air for cooling purposes over electric equipment present in the cubicles, the distributed air being adapted to be collected and returned, via connections arranged between the cubicles, to the air treatment unit where an extra intake for ambient air is adapted to supply extra air to the air treatment system in order to create an overpressure in the system while at the same time replacing an air loss caused by a leakage flow of air out of the cubicle series. The direction of the air current through the system may be changed.

In all cooling of electric equipment according to the above, it is desirable that the cooling air be primarily directed towards regions or components where the cooling requirement is greatest or gives the best effect. As an example, it can be mentioned that in switchgear cubicles where the electricity supply of the cubicles is arranged by means of multiphase lanes (or paths) of busbars in the form of copper busbars, extending through the cubicles, the greatest heat generation takes place in the mentioned lanes of busbars. This problem can be avoided by a reduction of the allowed currents through the electric busbars or by increasing the flow areas of the busbars, which in turn entails increased material consumption and increased costs. Consequently, it would be desirable to guide the cooling air passed into the cubicles in a more efficient way, making it possible to increase the rated currents for cubicles or apparatus in cubicles while maintaining the amount of coolinq.

Swedish Patent No. 449 150 describes semiprotection for lectric busbar internally in electric switchgear cubicles. This patent illustrates grooves or boxes which surround both horizontal and vertical busbars, the grooves also constituting protection against unintentional contact. By their shape, these protective grooves form channels which, in a series of cubicles, are naturally interconnected to form a coherent system of interconnected channels extending through the entire cubicle series, these channels surrounding the busbars located in the respective cubicles. The invention disclosed in this patent shows a method of utilizing the above-mentioned already existing channels to distribute cooling air to switchgear cubicles in a more efficient way.

SUMMMARY OF THE INVENTION

The present invention relates to a method and a device for distribution of cooling air to switchgear cubicles, The invention comprises distributing cooling air or other cooled gas, in a series of closely positioned switchgear cubicles which are closed to the surrounding air, in the cubicles along the same path as that along which the current through and into the cubicles is distributed. This is achieved by distributing air or gas to the respective cubicles in he cubicle series via channels in the form of protective grooves or busbar boxes which constitute semiprotection for those single-phase or multi-phase electric busbars which distribute current to the cubicles and to electric equipment present in the cubicles. The direction of the cooling gas distribution is the same as the current direction or the reverse.

By a solution of the cooling problem according to the invention, cooling gas is forced to primarily traverse the channels which surround the busbars, thus cooling these efficiently, whereupon the cooling gas, through outlets or openings in the channels, is adapted to effect a flow of cooling air over other equipment in the cubicles which may need cooling.

Cooling gas is supplied to a series of cubicles from at least one air treatment unit to a common channel for the cubicles which surrounds the current-distributing electric busbars common to all the cubicles in the series. This channel extends through all the cubicles in the series of cubicles. From this common channel, the cooling gas is distributed further out into each separate cubicle via branch channels connected to the common channel. These branch channels wholly or partially surround current-distributing electric busbars branched off into each separate cubicle.

At the connection of the branch channels to the common channel, adjustable valves are arranged, the opening area of which may be varied such that a balanced air flow can be obtained between the different cubicles in dependence on the cooling requirement of each individual cubicle.

The cubicles according to the invention are adapted to closed air treatment. In addition, the cubicles are designed such that a channel for return gas is formed in cooperation between the cubicles by providing adjacently located cubicles with openings at the bottom of a common cubicle wall.

The direction of the flow of cooling gas distributed to a series of cubicles and the corresponding direction of the flow of return gas can be reversed if desired.

An additional advantage of the cooling air distribution according to the invention is that it is advantageous to realize the air treatment unit itself as a cubicle module with an exterior design similar to that of the cubicle modules in the series of switchgear cubicles. In this way, the cubicle containing the air treatment unit is provided with openings for the mentioned cooling gas and return gas flows in the same way as the switchgear cubicles described above.

DESCRIPTION OF THE PREFERRED EMBODIMENTS

A preferred example of how the method according to the invention can be carried out will be described with reference to FIGS. 1–5.

Figure 1:
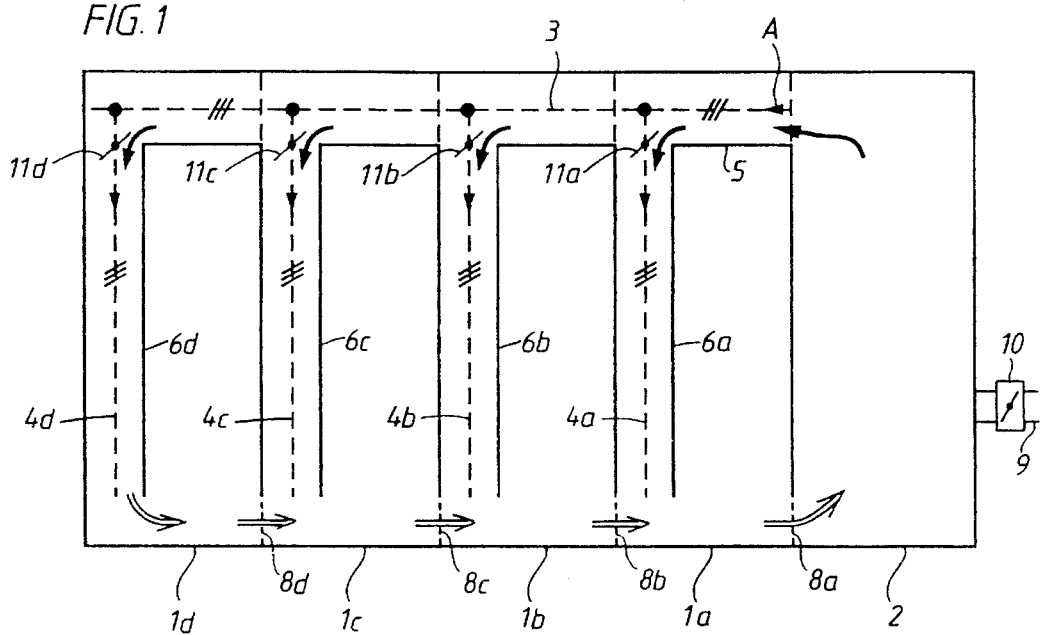
FIG. 1 shows an explanatory diagram of a series of switchgear cubicles with attached cubicles for air treatment and at the same time illustrates the flow paths for cooling gas and electric current, respectively, in the series of cubicles.
Figure 2:
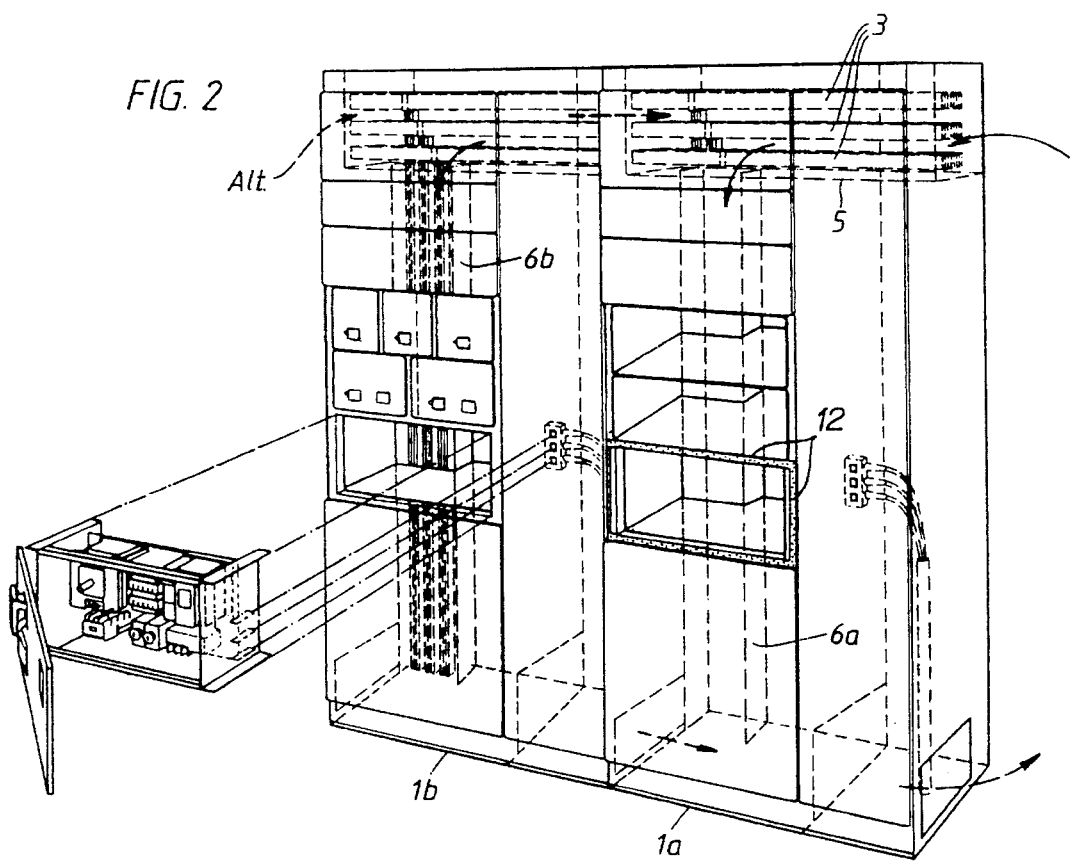
FIG. 2 shows an exploded view of two switchgear cubicles in a series of switchgear cubicles, illustrating a cooling gas flow via the channels formed by the protective grooves in the cubicles.
Figure 3:
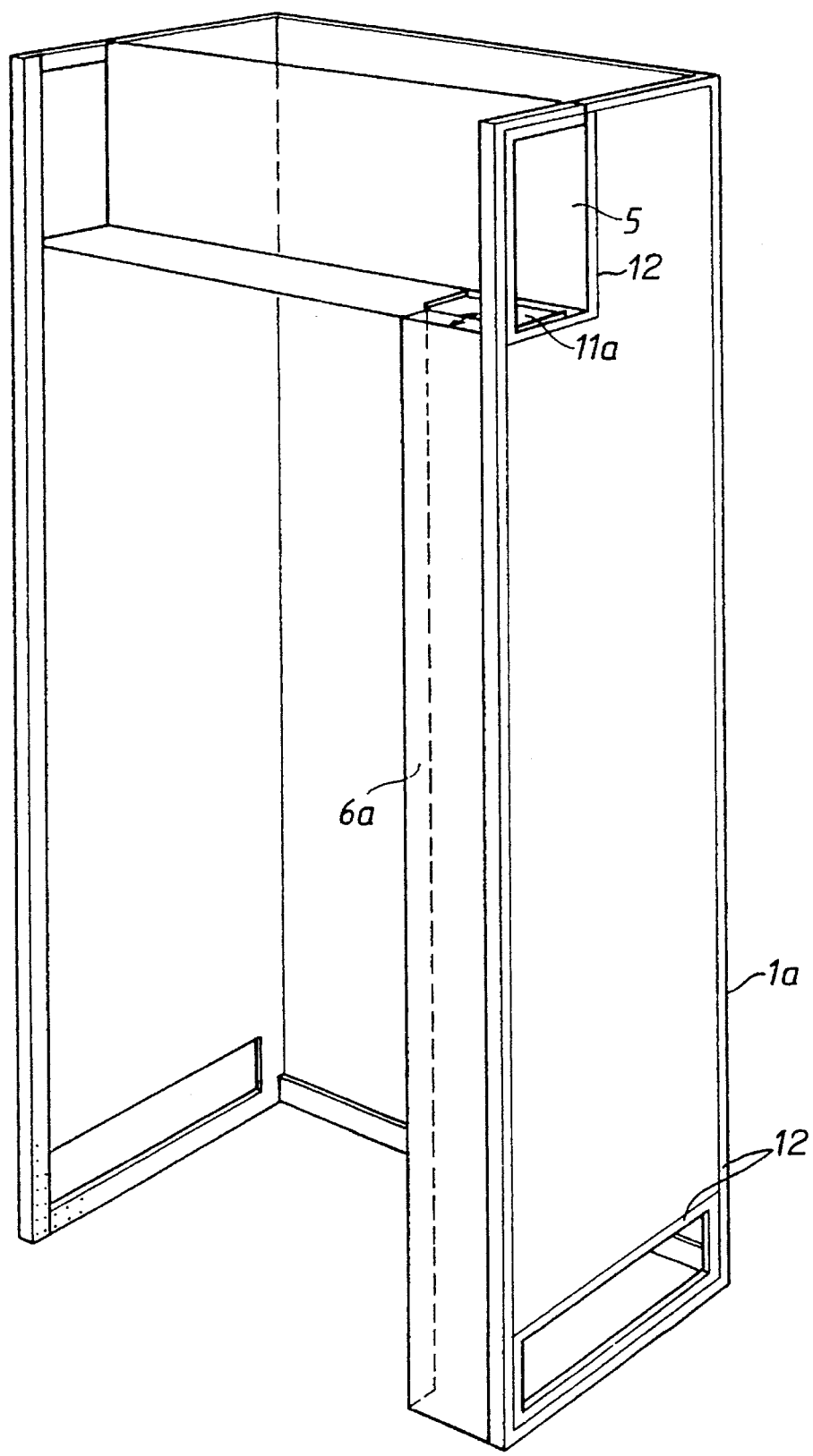
FIG. 3 illustrates, in a view of the back of a cubicle with the rear wall removed, how the cooling gas channels are arranged in an individual cubicle.

A number of apparatus cubicles $1a$–$1d$ are arranged close to each other and are insulated with respect to the surrounding atmosphere by seal means 12 (see FIGS 2 and 3). These apparatus cubicles contain electric equipment which requires cooling. In this example, cooling is assumed to be performed by means of air. This is, of course, not necessary since other gases or gas mixtures may replace air as refrigerant. Cooling of the air is carried out by an air-conditioning unit 2, also called an air treatment unit. In the figure the air treatment unit is housed in a cubicle with the same exterior as the apparatus cubicles $1a$–$1d$, that is, as a cubicle module in the same series of cubicles. This is, of course, not necessary, since any optional air treatment unit may be connected to the cubicle series.

The electric current into the cubicle series is introduced at A in the example and is passed via horizontal busbars 3 for distribution to the individual cubicles $1a$–$1d$ in the series. From the horizontal busbars 3 there extend vertical branches $4a$–$4d$ of busbars for distribution of current to the respectively individual cubicle for further distribution of current to electric equipment in the cubicles.

Around the horizontal and vertical busbars, busbar boxes 5, $6a$–$6d$ functioning to provide protective channels are aranged. The purpose of these busbar boxes is to serve as semiprotection against unintentional human contact with the current-carrying busbars. The vertical busbar boxes $6a$–$6d$ are partially open inwards towards electric equipment in the cubicles separated by shelf planes. In the present invention the intention is also to utilize these busbar boxes to form a busbar boxes 5, 6a–6d system for distribution of cooling air from an air-conditioning unit 2 via the mentioned channels for distribution to each individual cubicle so that the cooling air is conducted near the current-carrying and heat-emitting busbars 3, 4a–4d before the cooling air is released for the purpose of cooling out into apparatus in the individual cubicles.

The busbar boxes 5 around the horizontal busbars together form a continuous horizontal channel for the cubicles in the series of cubicles. This horizontal channel communicates with vertical channels formed by the vertical busbar boxes 6a–6d located inside the respective cubicles connected to the series, which vertical channels at the same time constitute those boxes around the vertical busbars which serve as semiprotection for these vertical busbars Cooling air flowing through the horizontal busbar boxes 5 will thereby, secondarily, upon entering one of the vertical busbar boxes 6a–6d cool the busbars 4a–4d located in these busbar boxes 6a–6d.

In the vertical busbar boxes 6a–6d, cooling air flows in the gaps between the walls of the vertical busbar boxes 6a–6d which form the vertical channels 6a–6d and the vertical busbars 4a–4d. A busbar box is either fully open towards the separated shelf planes of the cubicles for electric equipment, or provided with openings or outlets for distribution of cooling air out from the channels to electric equipment for cooling purposes. Through the mentioned outlets, the cooling air is distributed out to electric equipment located close to the outlets. The outlets may be freely designed for obtaining the desired cooling effect locally in the respective electric equipment installed in the cubicles, all according to the need of cooling of this equipment.

Consumed cooling air is collected at the bottom of the cubicles and is passed via sluices 8a–8d, which constitute openings between adjoining cubicles, back to an air treatment unit 2 for renewed treatment.

The principle of the path of the cooling air through the series of cubicles is thus that the cooling air follows the same paths as those of the current when this branches off into the cubicle system.

In an alternative embodiment of the apparatus cubicles, a certain overpressure prevails since the air treatment system can be supplied with additional intake air from the surroundings via an intake 9 with a regulating device 10. This additional intake air is intended to replace a leakage air flow out from the cubicle series and at the same time serves as a guarantee that uncleaned or uncooled ambient air does not leak into the system. With the regulating device 10 the quantity of ambient air into the air treatment system can be regulated.

It is important that the air flow through each cubicle 1a–1d can be controlled and influenced to avoid that any cubicle in the series receives too small an air flow or that back flows occur. By a good balancing of the air pressure into each individual cubicle by means of an adjustable valve 11a–11d busbars boxes 6a–6d, such a balancing may be attained.

Since all air treatment takes place in the air conditioning unit 2, it is possible to cover different types of desirable forms of treatment of the air, all according to the need. Thus, no limitation to cooling of return air from a series of cubicles is imposed. Drying, hydration, mechanical and/or chemical filtering or other chemical treatment of return air can be performed.

If desired, there is nothing preventing conducting the cooling air in the system in a direction which is the opposite to the one described above.

An embodiment with a series of cubicles comprising four apparatus cubicles has been described above. Also in this case, there is nothing preventing the invention from being applied to each series of cubicles comprising at least two apparatus cubicles 1a–1d. If considered desirable, more than one air treatment unit 2 may be arranged in the system. If the system of apparatus cubicles comprises more than one series of cubicles, cooling air and return air from another series of cubicles may be, respectively, passed to and collected in the series of cubicles which accommodates the air treatment unit via separate distribution channels between the different series of cubicles.

We claim:

1. The combination of a plurality of switchgear cubicles, air conditioning means for providing cooling gas to said cubicles, and busbar means for supplying electrical power to said cubicles; said plurality of cubicles being arranged in contacting side-by-side relationship, each cubicle containing electrical equipment, a horizontal busbar box to define a horizontal channel therein, and a vertical busbar box to define a vertical channel therein which communicates between said horizontal channel and said electrical equipment therein, said horizontal channels of said cubicles being in communication with one another; and said busbar means including a horizontal busbar portion which extends along said horizontal channels of said cubicles and a plurality of vertical busbar portions which extend from said horizontal busbar portion along said vertical channels of said respective cubicles to connect with the respective electrical equipment therein; said air conditioning means being connected to said cubicles to supply cooling gas to said horizontal and vertical channels and to said electrical equipment therein.

2. The combination of claim 1, wherein said cubicles define sluices to enable recirculation of cooling gas through said cubicles.

3. The combination of claim 2, wherein said air conditioning means is connected to supply cooling gas to said horizontal channels and said sluices are located at opposite ends of said cubicles.

4. The combination of claim 1, including seal means between said cubicles to insulate said cubicles from a surrounding atmosphere.

5. The combination of claim 1, including valves in said respective vertical channels to regulate cooling gas flow therethrough.

* * * * *